(12) United States Patent
Owegeser

(10) Patent No.: US 10,212,895 B2
(45) Date of Patent: Feb. 26, 2019

(54) CLEANING DEVICE

(71) Applicant: SMG Sportplatzmaschinenbau GmbH, Voehringen (DE)

(72) Inventor: Johann Owegeser, Illerrieden (DE)

(73) Assignee: SMG Sportplatzmaschinenbau GmbH, Voehringen (DE)

( * ) Notice: Subject to any disclaimer, the term of this patent is extended or adjusted under 35 U.S.C. 154(b) by 0 days.

(21) Appl. No.: 15/453,886

(22) Filed: Mar. 8, 2017

(65) Prior Publication Data

US 2017/0258011 A1 Sep. 14, 2017

(30) Foreign Application Priority Data

Mar. 9, 2016 (DE) .................. 20 2016 101 311 U

(51) Int. Cl.
| | |
|---|---|
| *E01H 1/05* | (2006.01) |
| *A01G 20/43* | (2018.01) |
| *E01H 1/04* | (2006.01) |
| *B06B 1/10* | (2006.01) |
| *B07B 1/30* | (2006.01) |
| *A47L 11/24* | (2006.01) |
| *A47L 11/40* | (2006.01) |
| *A01B 45/00* | (2006.01) |

(52) U.S. Cl.
CPC .............. *A01G 20/43* (2018.02); *A47L 11/24* (2013.01); *A47L 11/4027* (2013.01); *A47L 11/4041* (2013.01); *A47L 11/4066* (2013.01); *A47L 11/4069* (2013.01); *B06B 1/10* (2013.01); *B07B 1/30* (2013.01); *E01H 1/045* (2013.01); *E01H 1/056* (2013.01); *A01B 45/00* (2013.01)

(58) Field of Classification Search
CPC E01H 1/02; E01H 1/045; E01H 1/056; A47L 11/24; A47L 11/282; A47L 11/4027
USPC .......... 172/29, 30, 108; 15/52, 82, 83, 340.3
See application file for complete search history.

(56) References Cited

U.S. PATENT DOCUMENTS

| | | | |
|---|---|---|---|
| 762,239 A | 6/1904 | Lealand | |
| 8,209,809 B2 * | 7/2012 | Davis | E01H 1/045 15/52.1 |
| 8,308,868 B2 * | 11/2012 | Davis | E01H 1/045 134/42 |
| 8,321,993 B2 * | 12/2012 | de Bree | E01H 1/0854 15/340.3 |
| 8,418,304 B2 * | 4/2013 | Dairon | A01G 20/43 15/83 |
| 8,499,849 B2 * | 8/2013 | Dufty | A01G 20/43 172/521 |

(Continued)

FOREIGN PATENT DOCUMENTS

| | | |
|---|---|---|
| EP | 2884003 A2 | 6/2015 |
| FR | 2243029 A1 | 4/1975 |
| FR | 2858780 A1 | 2/2005 |

*Primary Examiner* — Gary S Hartmann
(74) *Attorney, Agent, or Firm* — Loginov & Associates, PLLC; William A. Loginov

(57) ABSTRACT

A cleaning device with a frame can be driven on a ground surface and with a vibrating screen which is mounted on the frame such that it can be moved to a limited extent and which is connected to a contact element. A vibrating roller is attached to the frame such that it can be rotated about a rotary axis, and it has an outer surface, in which radial elevations are formed. A pre-tensioning element pre-tensions the vibrating screen such that the contact element lies against the vibrating roller.

20 Claims, 2 Drawing Sheets

(56) References Cited

U.S. PATENT DOCUMENTS 9,702,102 B2 * 7/2017 Reinhold .............. E01H 1/0845

* cited by examiner

CLEANING DEVICE

BACKGROUND OF THE INVENTION

The invention relates to a cleaning device, which is provided in particular to clean a ground surface such as a lawn, an artificial turf or a sports field.

Cleaning devices of this type are typically used to clean materials such as sand or artificial turf fillers. In particular, materials such as these can be picked up, cleaned and then returned. In particular, a vibrating screen can be used for the cleaning.

Known cleaning devices often have a relatively complex design.

SUMMARY OF THE INVENTION

It is therefore the objective of the invention to produce a cleaning device in an alternative, e.g. simpler, way.

According to the invention, this is accomplished with a cleaning device as described in this disclosure, according to various embodiments.

The invention relates to a cleaning device with a frame, which is configured to drive over a ground surface, and with a vibrating screen, which is attached to the frame such that it can be moved to a limited extent and which is connected to a contact element.

The cleaning device has at least one vibrating roller, which is attached to the frame such that it can rotate about a rotary axis. The vibrating roller has an outer surface, in which a plurality of radial elevations are formed.

Furthermore, a pre-tensioning element is provided, which is configured to pre-tension the vibrating screen such that the contact element lies against the vibrating roller.

Using the claimed cleaning device, a drive for the vibrating screen can be produced in a simple way such that it can be moved continuously and such that materials placed on the vibrating screen are thereby effectively cleaned by the vibrating motion. The drive utilizes the outer surface provided with radial elevations and is particularly reliable and low-maintenance.

According to a preferred embodiment, the cleaning device has at least one drive roller that rests on the ground surface and is coupled with the vibrating roller such that the drive roller causes the vibrating roller to rotate when the frame moves on the ground surface. In this way, the movement of the frame on the ground surface can be used to drive the vibrating roller. For example, the frame can be pulled by another unit as a trailer, and the movement and energy thereby transmitted to the vehicle can be acquired by the drive roller. It is then possible to forgo a separate drive for the vibrating roller, for example, which saves effort and weight.

According to one embodiment, the vibrating roller can be connected to the drive roller by a gearing mechanism. The rotational speeds between the vibrating roller and the drive roller can be modified in this way.

The vibrating roller can also be configured concentrically with the drive roller. For instance, the drive roller and the vibrating roller can have a common rotary axis.

The vibrating roller can also have a separate drive, in particular a motor or electric motor. This permits an independent drive for the vibrating roller.

The vibrating roller can also be coupled with a drive of the cleaning device. In particular, this kind of drive can be a drive that is responsible for the forward movement of the frame over the ground surface. It can be an electric motor or an internal combustion engine, for example.

According to a preferred embodiment, the cleaning device has at least one cleaning brush for lifting material from the ground surface. Material that is to be removed from the floor and especially cleaned by the vibrating screen can therefore be lifted from the floor or ground surface and can be supplied to the vibrating screen.

The cleaning brush is suitably arranged upstream of the drive roller in the driving direction. This is proven to be advantageous in typical use situations.

The cleaning brush can especially be coupled with the drive roller by a gearing mechanism such that the drive roller causes the cleaning brush to rotate when the frame moves over the ground surface. This allows the aforementioned movement of the frame over the ground surface to be used to drive the cleaning brush, as well.

Alternatively, however, the drive roller may also be provided with its own drive, such as in the form of a motor, or it may be that the drive of the cleaning roller is derived from a drive of the cleaning device.

According to a development, a sliding carriage can be arranged next to the cleaning brush to adjust the depth of the cleaning brush. The cleaning device can thus be adapted to different ground conditions, such as different grass lengths.

The vibrating screen can suitably be moved linearly, in particular substantially horizontally linearly. This results in a simple and practical embodiment. Other patterns of movement, such as circular or ellipsoid movements, as well as vertical movements are entirely possible, however.

Preferably, the outer surface of the vibrating roller is divided into a plurality of flat surfaces, preferably eight flat surfaces, the elevations being formed on the respective edges between the flat surfaces. This has proven to be advantageous for typical applications. In particular, the vibrating roller can be simple to manufacture.

According to a different embodiment, the outer surface of the vibrating roller is configured with a wave-like shape, the elevations being formed on the respective wave peaks. This can result in a different, especially more even, curve of the movement of the vibrating screen.

Preferably, the contact element is configured as a wheel to bear upon the vibrating roller. An advantageously low level of friction can be achieved in this way, in particular when the wheel is configured to rotate parallel to the vibrating roller.

The contact element can be part of the frame or can be provided on a support that is connected to the frame.

The pre-tensioning element is suitably configured as a spring or as an elastic element. Reliable pre-tensioning can be provided in this way.

Said pre-tensioning element can be configured in particular as part of a screen mounting suspension. This allows two functions to be united in one element, which saves space and weight.

Advantageously, the vibrating screen can be oscillatingly mounted. A movement that achieves the intended cleaning effect can thereby be performed in a simple way.

According to an embodiment, the vibrating screen is suspended from a plurality of rubber strips.

According to a development, the vibrating screen can be adjusted for different grain sizes. This permits a simple adaptation for different cleaning tasks.

The cleaning device or the frame can be designed to be pulled by hand or can be configured with a coupling for attachment to a utility vehicle, especially a tractor, tractor mower or municipal vehicle. This permits the movement of the cleaning device over a ground surface that is to be cleaned, in particular a lawn, by means of an external unit such as a vehicle or else by hand.

However, the cleaning device or the frame can also be self-propelled. A motor, particularly an electric motor or an internal combustion engine, can be provided for this purpose, for example. The motor can also perform other drive tasks, such as driving the vibrating roller or cleaning brush, as has already been described above.

BRIEF DESCRIPTION OF THE DRAWINGS

The invention description below refers to the accompanying drawings, of which.

DETAILED DESCRIPTION

Figure 1:
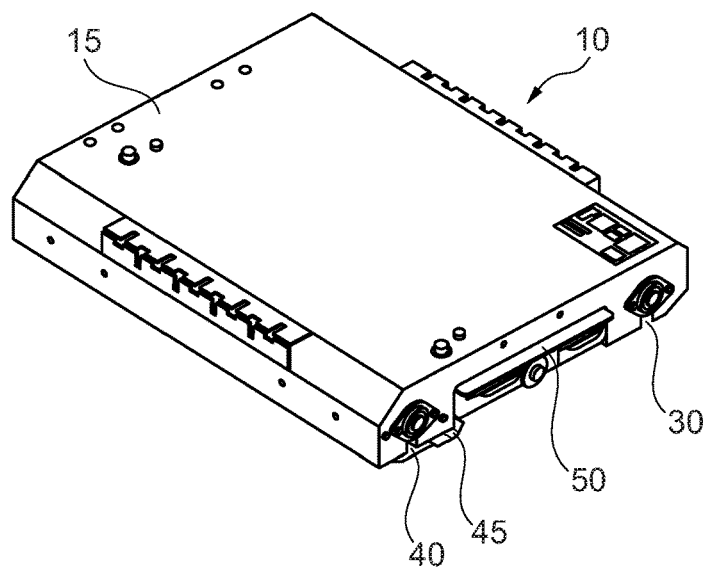
FIG. 1 is a perspective view of a cleaning device.

In the drawings, identical or corresponding elements are identified with the same reference signs and will therefore not be described again unless it is necessary. Similarly, the disclosures contained throughout the description can be attributed to identical parts with the same reference signs or component designations. The selected position specifications in the description, e.g. above, below, lateral, etc., also refer to the drawing currently being described and shown and, in the event of a change of position, similarly apply to the new position. Moreover, individual features or combinations of features of the various embodiments shown and described can also represent solutions that are independent, inventive or in accordance with the invention.

FIG. 1 shows a cleaning device 10 according to an embodiment of the invention.

The cleaning device 10 has a frame 15, which delimits the cleaning device 10 primarily outwardly and in particular upwardly.

The cleaning device 10 has a drive roller 30, which extends transversely to an intended direction of travel of the cleaning device 10 and is configured to rest on a ground surface.

The cleaning device 10 further has a cleaning brush 40 that is cylindrical, likewise extends transversely to the direction of travel of the cleaning device 10 and is likewise configured to rest on a ground surface.

The drive roller 30 and the cleaning brush 40 permit the frame 15 and the cleaning device 10 to move over a ground surface. In particular, this can be a ground surface that is a lawn, a patch of grass, an artificial turf or a sports field. Materials such as filler or sand are often found on ground surfaces such as these, and they must be cleaned using the cleaning device 10.

The drive roller 30 in particular performs the further function of bringing about a movement of the frame 15 over the ground surface. This movement can be utilized to drive components of the cleaning device 10, as will be discussed below.

The cleaning brush 40, on the other hand, performs the further function of picking up materials from the ground surface and subjecting them to cleaning within the cleaning device 10.

The cleaning device 10 is preferably configured such that it can be pulled by a vehicle, such as a tractor or a municipal vehicle. Owing especially to the configuration with the drive roller 30, which picks up the movement conveyed by the vehicle, it is possible to forgo separate drives, such as motors or another form of energy supply, within the cleaning device 10. This allows for a particularly compact and light design.

The cleaning device 10 further has a vibrating screen 50. Said screen can be discerned in FIG. 1 only by its outer parts, which protrude over the frame 15. The vibrating screen 50 is described in greater detail with reference to FIG. 2 further below.

A sliding carriage 45 is arranged directly adjacent to the cleaning brush 40. This is designed to slide on the ground surface. The sliding carriage 45 is arranged on the frame 15 such that it is vertically adjustable, and so the height of the rotary axis of the cleaning brush 40 can be set by the height adjustment of the sliding carriage 45. In this way, various properties of the ground surface that is to be cleaned can be accommodated; for instance, grass of different lengths can prompt adjustments to appropriate heights.

Figure 2:
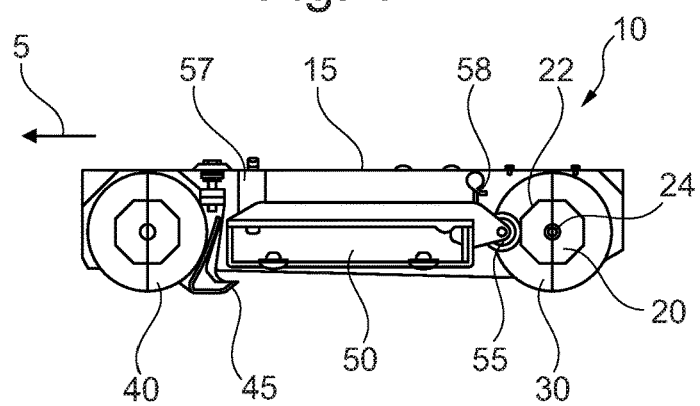
FIG. 2 is a lateral sectional view of the cleaning device in FIG. 1.

FIG. 2 shows the cleaning device 10 in a lateral sectional view. A direction of travel 5 is also marked here, this being the direction in which the cleaning device 10 is typically moved during normal operation for cleaning a ground surface. This does not rule out the possibility that the cleaning device 10 is also moved in the other direction, especially for purposes of transport, i.e. precisely when it is not in operation.

It can also be seen in particular in FIG. 2 that the vibrating screen 50 is disposed between the drive roller 30 and the cleaning brush 40. The vibrating screen 50 is suspended in the frame 15 in the manner described below.

On the left side, the vibrating screen 50 is suspended by a pre-tensioning element 57, which is configured as a rubber element. Said rubber element is responsible for pre-tensioning the vibrating screen 50 to the right. At the same time, however, the rubber element is elastic, and so, to a limited extent, the vibrating screen 50 can yield to a force that is directed to the left.

On the right side, the vibrating screen 50 is suspended on the frame 15 by a plurality of rubber strips 58. The rubber strips 58 permit a limited horizontal movement of the vibrating screen 50 within the frame 15.

As a result of the interaction between the pre-tensioning element 57 and the rubber strips 58, the vibrating screen 50 is held within the frame 15 at a height that is at least approximately constant and that, in particular, can then easily be varied when the vibrating screen 50 makes a possible pendulum-like motion.

A contact element 55 that is preferably configured as a wheel is arranged on the right side of the vibrating screen 50. The significance of this element will be addressed in greater detail below.

As can also be seen in FIG. 2, the cleaning device 10 additionally has a vibrating roller 20. Said roller is configured concentrically with the drive roller 30, and so the drive roller 30 and the vibrating roller 20 have a common rotary axis 24.

The vibrating roller 20 has an outer surface 22 that is preferably octagonal. This means that the outer surface 22 has a total of eight flat surfaces adjoining each other at the respective corners. The corners represent radial elevations here, since they are furthest removed from the rotary axis 24.

The contact element 55 is immediately adjacent to the vibrating roller 20, so it comes into contact with the outer surface 22 of the roller. When the cleaning device 10 is moved over the ground, the drive roller 30 moves due to the contact between the ground and the drive roller 30, this rotation being transmitted directly to the vibrating roller 20. As a result, the outer surface 22 of the vibrating roller 20 also similarly rotates.

As has already been mentioned above, the pre-tensioning element 57 exerts rightward pre-tension on the vibrating screen 50. This pre-tension causes the contact element 55 to lie directly against the outer surface 22 of the vibrating roller 20. It thus alternatingly comes into contact with one of the corners and one of the surfaces. Owing to the different radial distances to the rotary axis 24, an alternating leftward force is exerted on the contact element 55 and thus on the vibrating screen 50, and so the vibrating screen 50 is correspondingly moved horizontally. This results in a movement of the vibrating screen 50 that is particularly simple to implement and that is derived directly from the movement of the cleaning device 10 over the ground.

Figure 3:
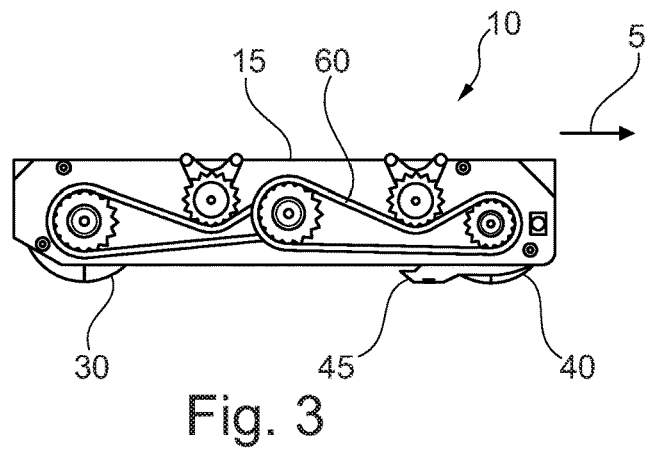
FIG. 3 is another lateral sectional view of the cleaning device in FIG. 1.

FIG. 3 shows a further lateral sectional view of the cleaning device 10, with the direction of travel 5 here pointing in the other direction so that the positions of the drive roller 30 and the cleaning brush 40 are also reversed compared to FIG. 2.

A gearing mechanism 60 can be seen here which links the drive roller 30 with the cleaning brush 40 such that the cleaning brush 40 is also driven by the rotary movement of the drive roller 30. Therefore, the drive roller 30 can cause not only the vibrating screen 50 but also the cleaning brush 40 to rotate.

Figure 4:
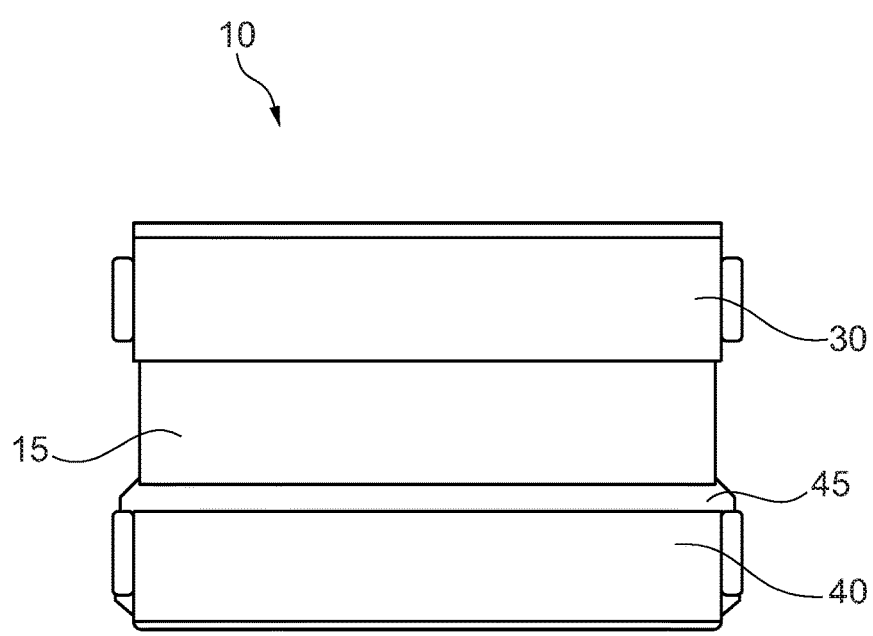
FIG. 4 is a bottom view of the cleaning device in FIG. 1.

FIG. 4 is a bottom view of the cleaning device in FIG. 1. A cleaning device 10 can have a frame 15, a drive roller 30, a cleaning brush 40, and a sliding carriage 45.

The wording of the claims submitted with the application at this time and subsequently is without prejudice to the obtaining of further protection.

Should a closer examination, in particular also of the relevant prior art, reveal that one feature or another is advantageous for the objective of the invention but not crucially important, it is understood that a wording is sought which no longer includes such a feature, in particular in the main claim. Sub-combinations of this type are also covered by the disclosure of the present application.

It should further be noted that the configurations and variants of the invention described in the various embodiments and shown in the figures can be freely combined with one another. In so doing, individual or multiple features can be freely interchanged with each other. These combinations of features are likewise included in the disclosure.

The back-references made in the dependent claims refer to further embodiments of the subject matter of the main claim by the features of the respective sub-claims. These back-references, however, should not be interpreted as renouncing the right to obtain independent protection as subject matter for the features of the related sub-claims.

Features that were only disclosed in the description, or individual features from claims that contain multiple features, can be incorporated into the independent claim or claims at any time as features that are essential to the invention in order to delimit it over the prior art, even in cases where these features were mentioned in connection with other features or achieve particularly favorable results in connection with other features.

Although the invention has been described on the basis of exact embodiments that are illustrated in the most extensive detail, it is noted that this serves only for illustration and that the invention is not necessarily limited to it as alternative embodiments and methods become clear for experts in light of the disclosure. Accordingly, changes may be taken into consideration which can be made without departing from the contents of the described invention.

What is claimed is:

1. A cleaning device comprising:
   a frame configured to drive over a ground surface;
   a contact element;
   a vibrating screen movably attached to the frame, the vibrating screen connected to the contact element;
   at least one vibrating roller rotatably attached to the frame and rotatable about a rotary axis, the at least one vibrating roller having an outer surface with a plurality of radial elevations formed on the outer surface;
   a pre-tensioning element configured to pre-tension the vibrating screen such that the contact element lies against the vibrating roller; and
   at least one drive roller configured to rest on the ground surface, the drive roller coupled with the vibrating roller such that the drive roller causes the vibrating roller to rotate when the frame moves on the ground surface, wherein the vibrating roller is configured concentrically with the drive roller.

2. The cleaning device according to claim 1, wherein the vibrating roller is connected to the drive roller by a gearing mechanism.

3. The cleaning device according to claim 1, wherein the cleaning device has at least one cleaning brush arranged upstream of the drive roller in the direction of travel configured to pick up material from the ground surface.

4. The cleaning device according to claim 3, wherein the cleaning brush is coupled with the drive roller by a gearing mechanism such that the drive roller causes the cleaning brush to rotate when the frame moves over the ground surface.

5. The cleaning device according to claim 3, wherein a sliding carriage is arranged next to the cleaning brush to adjust the depth of the cleaning brush.

6. The cleaning device according to claim 1, wherein the vibrating screen can be moved linearly.

7. The cleaning device according to claim 1, wherein the outer surface of the vibrating roller is divided into a plurality of flat surfaces.

8. The cleaning device according to claim 1, wherein the contact element is configured as a wheel to bear upon the vibrating roller.

9. The cleaning device according to claim 1 wherein the contact element is part of the frame.

10. The cleaning device according to claim 1, wherein the pre-tensioning element is configured as a spring or as an elastic element.

11. The cleaning device according to claim 1, wherein the pre-tensioning element is configured as a part of a screen mounting suspension.

12. The cleaning device according to claim 1, wherein the vibrating screen is oscillatingly mounted.

13. The cleaning device according to claim 1, wherein the vibrating screen is suspended from a plurality of rubber strips.

14. The cleaning device according to claim 1, wherein the vibrating screen is adjustable for different grain sizes.

15. The cleaning device according to claim 1, wherein the cleaning device or the frame is arranged to be pulled by hand.

16. The cleaning device according to claim 1, wherein the cleaning device or the frame is arranged to be self-propelled.

17. The cleaning device according to claim 6, wherein the vibrating screen can be moved horizontally linearly.

18. The cleaning device according to claim 7, wherein the vibrating roller is divided into eight flat surfaces.

19. The cleaning device according to claim 1 wherein the contact element is on a support connected to the frame.

20. The cleaning device according to claim 1, wherein the cleaning device or the frame has a coupling for attachment to a utility vehicle.

\* \* \* \* \*